Patented July 16, 1940

2,208,288

UNITED STATES PATENT OFFICE 2,208,288

INK FOR WRITING ON BLUEPRINTS

Robert N. Cook, Twin Falls, Idaho, and Hampton C. Godbe, Salt Lake City, Utah

No Drawing. Application July 11, 1938, Serial No. 218,628

3 Claims. (Cl. 134—28)

Our invention relates to inks and has for its objects to provide a new and efficient water resistant ink for use on blueprints and blue line prints and other maps or drawings.

A further object is to provide an ink which may be used on blueprints or blue line prints, which will eradicate the blue coloring on the face of the print leaving a whitened line or area thereon.

A further object is to provide an ink for writing on blueprints or blue line prints, which ink will eradicate the color from the print and leave a coloring on the paper, cloth or other mounting depending upon the color used in the particular ink employed.

A still further object is to provide an ink for use on blueprints or blue line prints which will remove the blue color from the face of the print and permit other colors to be placed on the print or other lines to be drawn thereon or thereover as desired.

A still further object is to provide an ink which may be of any desired color and which ink when placed on a blueprint or blue line print or any other material coated with blueprint solution, will remove the blue color without destroying or deteriorating the paper, cloth or material used, and will leave the line or area in the color of the ink used.

After blueprints or blue line prints have been made from any type of sketches, drawings, maps, charts, etc., it is often desirable to make changes on these blueprints or blue line prints by the addition of white or colored lines or areas on any portion of the print. This can best be accomplished by using an ink which will remove the blue color from that portion of the print to which the liquid has been applied. The application of this liquid to the face of the print will remove the blue color, leaving a white line or area, or it may leave a colored line or area according to the color of the ink applied.

Heretofore it never has been possible to do this speedily and efficiently and still have the lines water resistant and sharply defined, without objectionable incrustation or soapiness and without causing any subsequent injury to the blueprint cloth, paper or mounting. With our invention, we have produced a solution capable of achieving this result, and this solution may be colored as desired by the addition thereto of aniline dyes or any other suitable dyes.

These objects we accomplish with the formulae disclosed in the following application and outlined in the appended claims.

In our formulae we preferably make a saturated solution of lithium hydroxide (LiOH) dissolved in distilled or plain water. After filtering this solution, a clear fluid is obtained for use on blueprints or blue line prints.

If coloration is wanted in the lines or areas to be made on the blueprint or blue line print, then sufficient dye is added to the solution to make the color desired. Aniline dyes are preferable, as they do not affect the base solution in its chemical reactions.

We do not desire to limit the solution to any given percentage of lithium hydroxide, although we have experimented with several percentage solutions of lithium hydroxide and find the one submitted is preferable.

Having thus described our invention, we desire to secure by Letters Patent and claim:

1. A blueprint marking ink composed of a substantially saturated aqueous solution consisting of lithium hydroxide and water.

2. A blueprint marking ink composed of a coloring component and a substantially saturated aqueous solution consisting of lithium hydroxide and water.

3. Improved process of eradicating blue coloration from, and simultaneously marking, an area of a blueprint, which consists essentially in applying to such blueprint area, as by writing thereon, an ink composed of a substantially saturated solution consisting of lithium hydroxide and water.

ROBERT N. COOK.
HAMPTON C. GODBE.